United States Patent Office 3,333,395
Patented Aug. 1, 1967

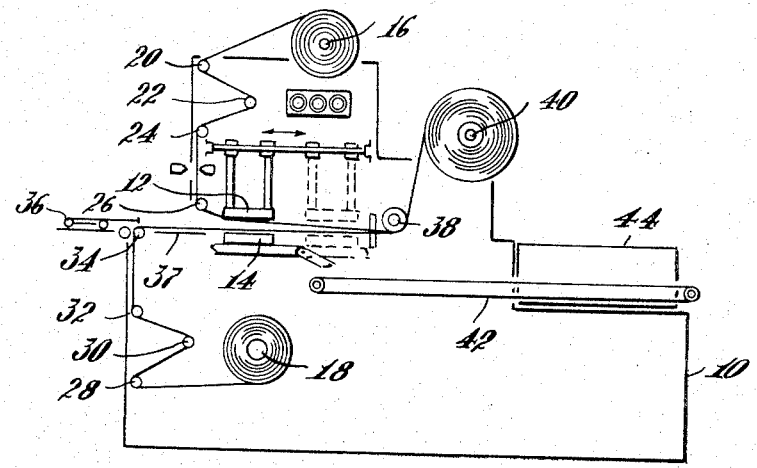
Fig. 1
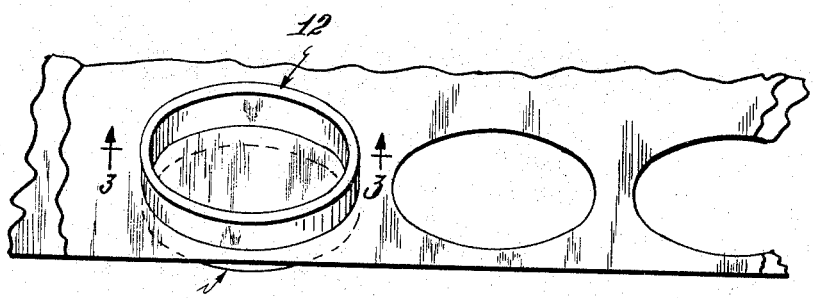
Fig. 2
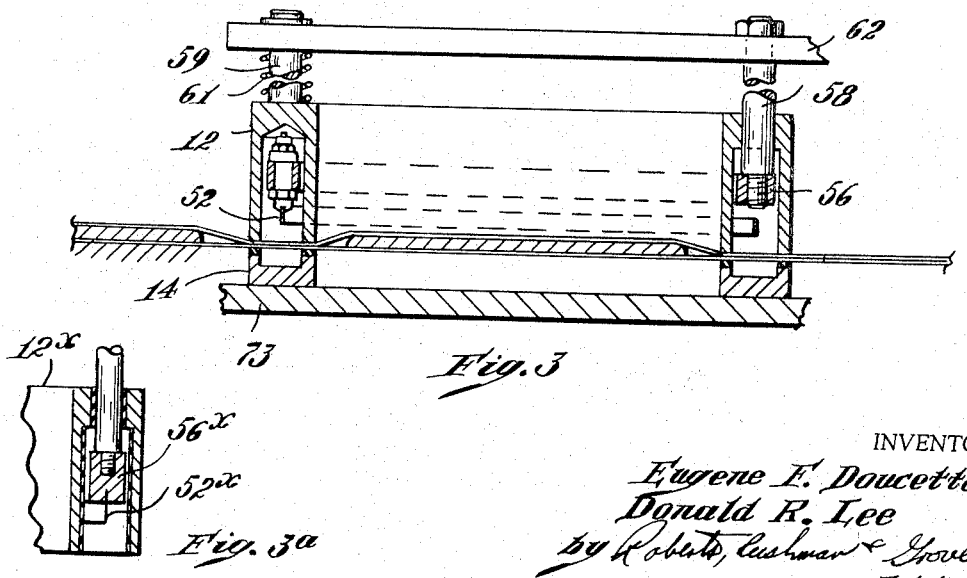
Fig. 3
Fig. 3a
INVENTORS
Eugene F. Doucette
Donald R. Lee
by Roberts, Cushman & Grover
Att'ys Aug. 1, 1967   E. F. DOUCETTE ETAL   3,333,395
APPARATUS FOR HEAT-SEALING ARTICLES BETWEEN SHEETS OF
TRANSPARENT MATERIAL
Filed Sept. 11, 1964   3 Sheets-Sheet 2
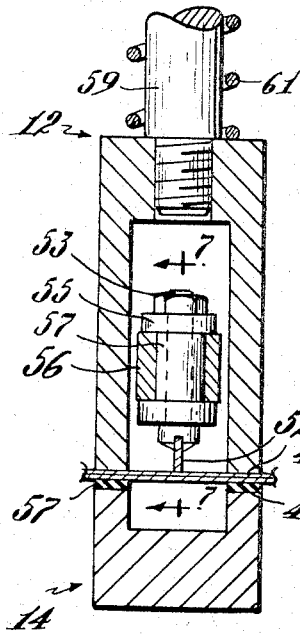
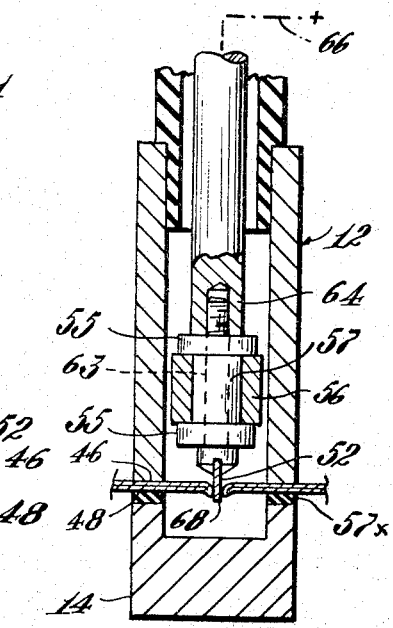
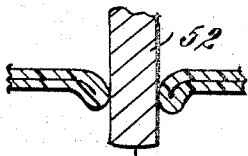
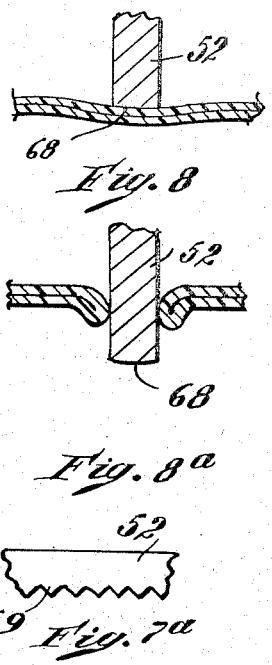
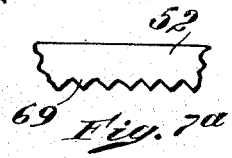
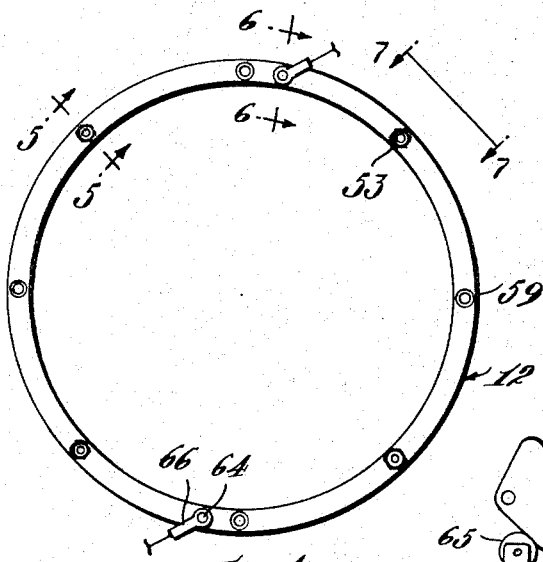
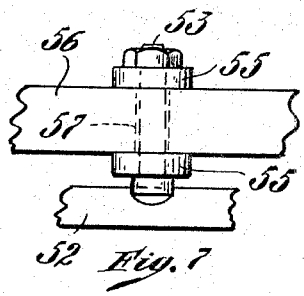
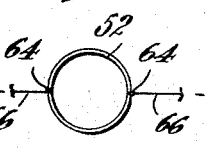
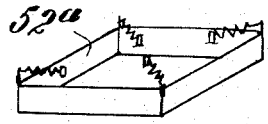
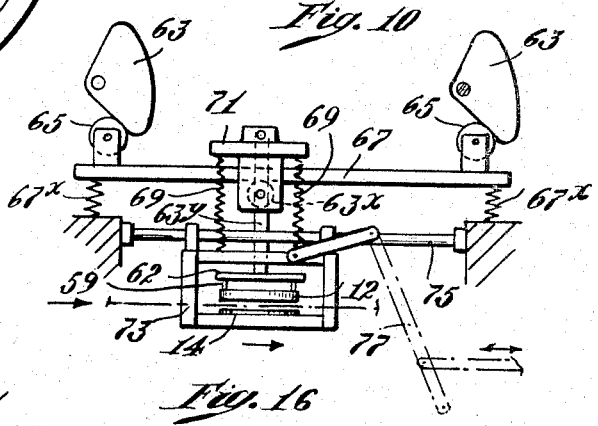

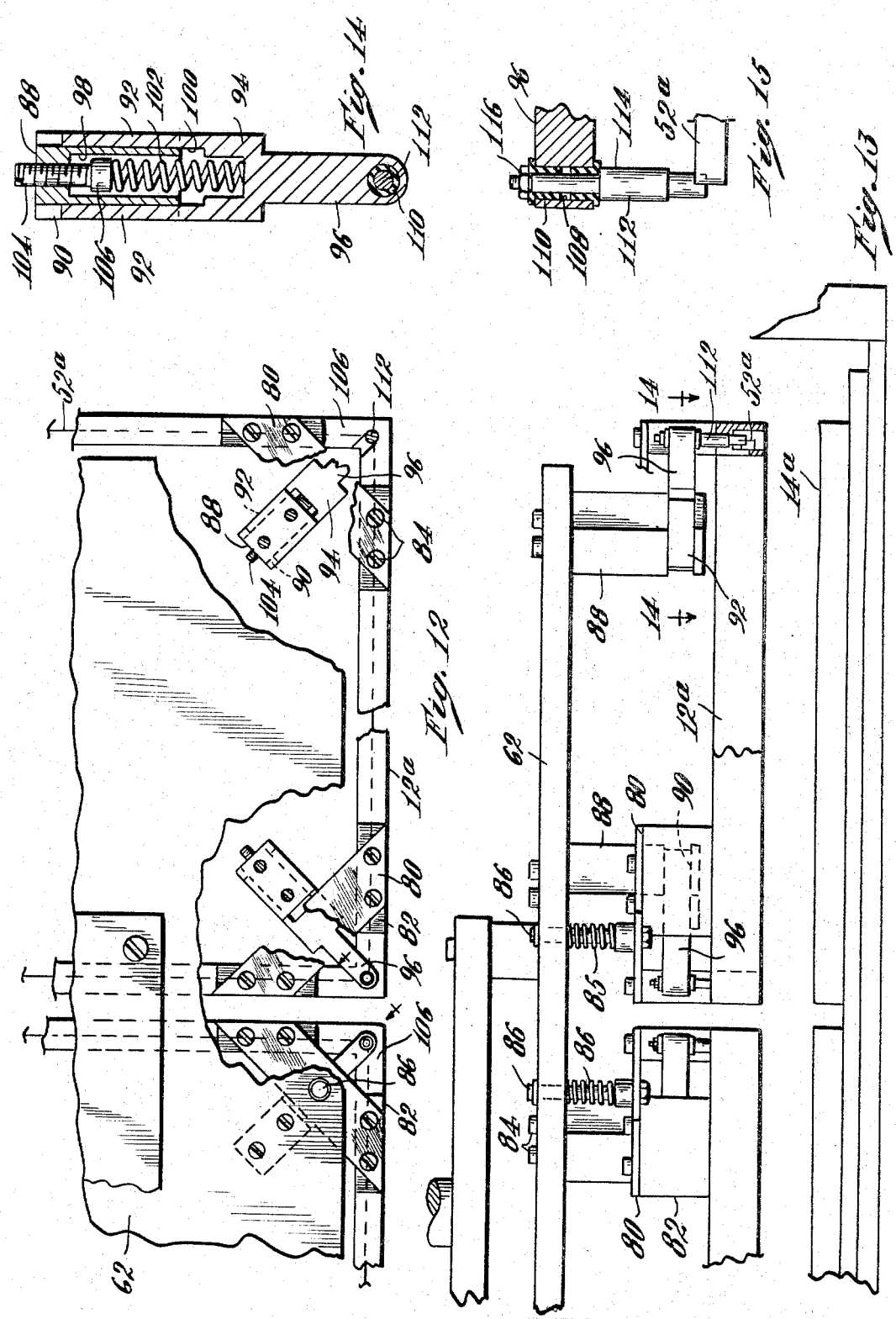

3,333,395
APPARATUS FOR HEAT-SEALING ARTICLES BETWEEN SHEETS OF TRANSPARENT MATERIAL
Eugene F. Doucette, Burlington, and Donald R. Lee, Newton, Mass., assignors to Lee Packaging Machinery Corp., Needham Heights, Mass., a corporation of Massachusetts
Filed Sept. 11, 1964, Ser. No. 395,790
7 Claims. (Cl. 53—182)

This invention relates to sealing of articles between sheets of fusible plastic material and has for its principal objects to provide apparatus for obtaining a positive continuous seal between the sheets marginally of an article to form an envelope which will withstand shrink-fitting to the article without failure of the seam; and to provide apparatus for effecting such positive sealing which is of relatively simple construction and is adapted for continuous and/or automatic packaging of articles of various kinds and shapes and to the packaging of multiple articles of the same or different kind.

The apparatus comprises clamping elements cooperable to clamp spaced portions of the sheets marginally of the article and means operative, in a narrow area of the unclamped portions of the sheets between said clamping elements, to effect fusion of the sheets to each other and separation along the median of the narrow area. The clamping elements have spaced clamping faces which grip spaced portions of the sheets marginally of the article, leaving the portions of the sheets, intermediate the gripped portions, isolated from and free of any tension in the portions of the sheets externally of the clamping elements. The heating element is supported in a groove between the clamping faces of one of the clamping elements for movement perpendicular to the plane of the sheets and there is means for effecting movement of the clamping elements in engagement with the sheets and thereafter moving the heating element into engagement with the sheets intermediate the clamping elements. Preferably the groove is relatively narrow and its sides are covered with insulation. In accordance with the invention, the heating element has a contour corresponding to the periphery of the article to be packaged, is comprised of a substantially uniformly continuous ribbon of metal which is substantially rectangular in cross-section, which is of relatively greater depth than thickness, and has in one form a lower operating edge which is slightly convex. Alternatively the lower edge may be serrated. The ribbon is supported at its upper edge within the groove at uniformly spaced points by means insulated from its supporting structure and current is supplied to the ribbon at its upper edge by means of conductors secured thereto at diametrically disposed points, the conductors being suitably insulated from the support. A ribbon formed into a circle is employed to seal circular packages and a ribbon formed into a rectangle is employed to seal rectangular packages. By using a very narrow groove in the order of twice the thickness of the ribbon, a ribbon of circular configuration can be maintained substantially uniformly circular in spite of expansion and contraction during heating. When a ribbon of rectangular configuration is used, yieldable supports are provided at the four corners operable, by imparting outward pressure thereto, to distend the ribbons in tension throughout.

Sheets of fusible material as, for example, polyethylene are supplied continuously from suitable rolls in spaced relation to each other between the clamping elements, there is means for moving an article or articles to be packaged between the sheets and clamping elements, means for bringing the clamping elements together, lowering the heating element into operative position, shifting the clamping elements bodily in the direction of feed, and separating them to permit the sealed article to be discharged, means for taking up the waste sheets, and means for returning the clamping elements to their initial position for the next operation.

The invention will now be described in greater detail with reference to the accompanying drawings wherein:

FIG. 1 diagrammatically illustrates a machine embodying the heat-sealing means forming the subject of this invention, omitting the details of the mechanism for effecting movement of the clamping elements to and from each other and translational movement from loading position to discharge and back again;

FIG. 2 is a perspective of a pair of clamping elements, of which there may be several arranged transversely of the machine with the sheet material situated between them, showing the waste material at the right-hand side;

FIG. 3 is a section taken on the line 3—3 of FIG. 2, showing one pair of clamping elements engaged with sheets, holding them clamped about a flat circular article, showing the waste at the right-hand side and showing, in elevation, part of the supporting structure of the upper clamping element;

FIG. 3a is a fragmentary section of the upper clamping element showing an alternative support for the heating element;

FIG. 4 is a plan view of the upper one of a pair of the clamping elements;

FIG. 5 is a section taken on the line 5—5 of FIG. 4, to very much larger scale, showing a pair of clamping elements and the heating element;

FIG. 6 is a section taken on the line 6—6 of FIG. 4, showing the heating element passing through the sheet material and also showing the electrical connection thereto;

FIG. 7 is a fragmentary elevation on the line 7—7 of FIG. 4, showing the heating element attached to its support;

FIG. 7a is a fragmentary elevation of an alternative form of heating element having a serrated lower edge;

FIG. 8 is an enlarged fragmentary view showing the initial contact of the heating element with the sheets;

FIG. 8a is an enlarged fragmentary view showing the heating element passing through the sheets and the fused bead-like edges formed at both sides of the heating element;

FIG. 9 is a plan view, to very much smaller scale, of a packaged article of circular shape such as a record or pizza;

FIG. 10 is a plan view, to small scale, of the heating element;

FIG. 11 is a plan view, to very much smaller scale, of a packaged articles of rectangular shape;

FIG. 11a diagrammatically shows a rectangular heating element yieldingly supported at its four corners to hold its sides taut;

FIG. 12 is a fragmentary plan view of the upper clamping element and supports for the heating element for sealing rectangular packages;

FIG. 13 is an elevation of the upper clamping element shown in FIG. 12, illustrating the yieldable supports for the heating element and the lower clamping elements beneath them;

FIG. 14 is a section through one of the yieldable supports for the heating element taken on the line 14—14 of FIG. 13;

FIG. 15 is an elevation, partly in section, of a supporting post securing a corner of the heating element to the support shown in FIG. 14;

FIG. 16 shows means for effecting movement of the clamping elements into or out of engagement and translation of the clamping elements from loading position to discharge position and back again.

Referring to FIG. 1, the machine has a frame 10 on which are supported one or more pairs of upper and lower clamping elements 12, 14, arranged in spaced relation transversely of the frame for relative movement into and out of engagement perpendicular to each other and for bodily movement horizontally from left-to-right and back again, incident to clamping an article between sheets of polyethylene, effecting a seal marginally of the article, separating the sealed article from the waste sheet material, and discharging it. A pair of supporting spindles 16 and 18 provide for mounting spools of polyethylene sheet material for delivery in spaced relation to the clamping elements 12 and 14. A series of spaced parallel guide bars 20 to 26 inclusive, guide the sheet from the upper spool to the underside of the upper clamping element 12. A series of guide bars 28 to 34 inclusive, guide the sheet material from the lower spool to the upper side of the clamping element 14.

A feeder 36 (FIG. 1) of any suitable kind and either manually or automatically operated is mounted at the left-hand side of the frame substantially at a level with the lower clamping element for the purpose of pushing the article or articles to be packaged along the upper surface of the lower sheet into position between the clamping elements 12 and 14. The lower sheet is supported at the level of the lower clamping element by spaced parallel interlocking fingers 37.

The clamping elements are supported for movement into engagement with the sheets when the articles are properly positioned as will appear hereinafter. After effecting the seal, which not only joins the sheet material marginally of the article but also separates it from the waste, the waste is led about a guide roller 38 and wound onto a spool mounted on the spindle 40. The sealed articles are deposited onto a conveyor 42 for delivery to a place of discharge without further processing or, if desired, to a shrinking chamber 44 to contour the envelope to the shape of the article.

The clamping elements 12 and 14, by means of which the sealing of the sheet material is effected, are formed to correspond to the contour of the article to be packaged. As herein shown (FIGS. 2 and 6), they are annular and of substantially U-shaped cross-section so that each element has spaced clamping faces 46—46 and 48—48 with a groove therebetween which, when brought into engagement, press the sheet material together marginally of the article which, in this case, would be a circular article such as a record or pizza (FIG. 9), holding the portions of the sheets between the respective pairs of clamping faces 46, 48 and 46, 48 immobile and free of any tension which may exist in the material internally or externally of the clamping element. For optimum results, the cross-sectional width of the clamping element should be as narrow as practical and in order to avoid any possibility of short circuit the inner surfaces of the groove should be coated with an insulating material. Preferably the inner surface of the groove is coated with Teflon.

A continuous ribbon 52 of substantially rectangular cross-section is supported in the groove between the clamping faces 46—46 of the upper clamping element for movement of one of its narrow edges substantially perpendicular to the plane of the sheet material, downwardly toward and into the lower clamping element. As illustrated (FIG. 7), the upper edge of the ribbon 52 is fixed to the lower ends of bolt 53 supported peripherally of the rigid ring 56 at uniformly spaced points. The bolts 53 are insulated at their ends from the ring 56 by nonconductive washers 55 of suitable insulation and, intermediate their ends, by non-conductive sleeves 57 which pass through the ring. Any suitable non-conductive material may be employed which prevents not only conductance of current from the ribbon to the supporting ring 56 but also prevents heat loss from the ribbon 52 to the supporting ring 56. When a ribbon of circular configuration is employed, it is desirable, in order to maintain uniformity in spite of expansion and/or contraction, to employ a groove which is in the order of twice the thickness of the ribbon and to insulate the entire inside of the groove.

FIG. 3a illustrates a modified support for the ribbon in which the ring 56x is comprised of non-conductive material and the ribbon 52x is set into the lower side of the ring. The ring 56x is supported in the upper clamping element 12x and the groove is coated with insulation.

The ring 56 is secured to the lower ends of rods 58 (FIGS. 3 and 16) which extend upwardly through the top of the clamping element 12 and are secured to a plate 62 which extends transversely of the machine and provides the support for a plurality of upper clamping elements. The clamping elements 12 are fixed to the lower ends of rods 59 (FIG. 3), the upper ends of which are slidable through the plate 62 and springs 61 are disposed about the rods 59 to hold the clamping elements 12 spaced from the plate 62 when the latter is raised. The plate 62 is supported by rods 63y on hangers 71 for movement in a perpendicular direction with respect to the lower clamping elements so as first to bring the upper clamping elements into engagement with the sheet material and press the latter against the lower clamping elements and then to force the ribbon 52 downwardly into and through the sheet material so as to effect fusing, as will appear hereinafter, of a relatively narrow area between the clamping faces all the way around the article. Preferably a yieldable gasket 57x is applied to the clamping faces of the lower clamping element to insure application of pressure all the way around in spite of minor misalignments. Lowering of the plate 62 is effected by cams 63—63 operable, by contact with rollers 65—65 mounted on a bar 67, to press the latter downwardly. The bar 67 is held in a raised position against the cams by springs 67x—67x. Normally, the upper clamping elements are held raised by compression springs 69—69 bearing at their upper ends on the hangers 71 and at their lower ends on the upper part of a carriage 73, the latter supporting the lower clamping elements 14. A roller 63x on the bridged rods 63y, having contact with the lower sides of the bar 67, provides for forcing the bridged rods 63y downwardly. The hanger 71 is slidably mounted on the bar 67, the carriage 73 is slidably mounted on the bar 75, and there is linkage 77 for effecting linear movement from the place of loading to discharge and back again.

The ribbon 52 constitutes the heating element by means of which fusion of the sheets to each other about the article and separation of the resulting package from the waste material are effected and, as will be seen by reference to FIGS. 5 to 8, is of relatively greater depth than thickness. A Nichrome ribbon is preferred of ⅛ to ¼ inch in depth and of .020 to .015 inch in thickness. Ribbons of the foregoing dimensions are commercially available and, as supplied, the edges are slightly convex, characteristic of the manufacture, the convexity being shown in somewhat exaggerated form in FIG. 8a. Alternatively the lower edge of the ribbon 52 may be serrated as shown at 69 (FIG. 7a).

Binding posts 64—64 (FIG. 6) are secured at diametrically opposed points to the upper edge of the ribbon 52 by solder and for this purpose have posts 63 which extend downwardly through the ring 56 through insulation 57.

The ribbon is formed to the contour of the article to be sealed as are the clamping elements, its ends being joined so that the heating element is continuous and of substantially uniform cross-section throughout. Due to this continuity and to the fact that the depth of the ribbon is relatively large in proportion to its thickness, a very uniform distribution of heat throughout the ribbon may be attained thus eliminating cold spots peripherally thereof. By employing insulation which is resistant not only to electrical conductance but also to heat conductance very little flow of heat takes place from the ribbon to the supporting structure, thus further minimizing the tendency for cold spots to form at the points of support and hence contributing to uniform temperature at the acting face of the ribbon.

The convex acting face 68 of the ribbon shown in FIGS. 8 and 8a is advantageous in that when it is pressed down against the sheet material the latter is conformed to its curved surface, thus improving the contact of the sheets with the edge and with each other. This insures a high degree of heat conductance to the sheet material in spite of slight irregularities therein, such as wrinkles, and, in turn, greatly enhanced uniformity in fusing of the sheets to each other. Local disturbances and cooling are minimized by the fact that the ribbon is situated within a closed chamber during its operation, to wit, within the chambers formed by the engagement of the clamping elements 12 and 14 with the sheet material at opposite sides thereof, which prevent vagrant air currents from striking the heating ribbon and which, in fact, maintains a substantially uniform temperature during fusing. Additionally, as pointed out heretofore, the clamping faces of the clamping elements hold the sheet immobile and in a relaxed condition at the time of sealing so that there is no tension tending to pull parts of the sheets away from each other along the line of fusing. As a result, the ribbon, in passing through the sheets, as shown in FIG. 8a, effects a coalescence of the sheets which is of bead-like form both marginally of the envelope, within which the package is situated, and marginally of the edge of the hole left by separation of the packaged article from the sheets.

A current in the order of 20 to 40 amperes at a potential of 9 volts provides the heating necessary to effect fusion of the polyethylene sheets employed herein. It is to be understood however that the amperage and voltage may be modified according to the kind and gauge of sheet material that is employed and that any fusible sheet material may be substituted for the polyethylene sheet material used herein.

After sealing is effected, as previously pointed out, the plate 62 is shifted toward the right by means of the linkage 77 heretofore explained, the clamping elements are separated to permit the sealed article to drop onto the conveyor, the waste material is wound up on the spool 40 and then the clamping elements are returned to their initial position for the next operation. Optionally, the clamping elements may be stationary, that is, the sealed article may be discharged from between the sealing elements after they have separated without lateral movement.

The sealing means shown in the preceding figures, to wit, FIGS. 4, 5, 6 and 10, is designed to effect a seal peripherally of an article which is substantially circular in shape. FIGS. 11a, 12, 13, 14 and 15 show a modification of the sealing means for making a seal around a package which is substantially square or rectangular as shown in FIG. 11. The upper clamping element 12a is rectangular and is of U-shaped cross-section so that it has spaced clamping faces with a groove therebetween for engagement with corresponding faces of a rectangular lower clamping element 14a correspondingly U-shaped in cross-section. Each of the rectangular clamping elements has transversely of each corner a diagonal plate 80 secured at its opposite ends to vertically disposed spacer blocks 82 mounted on the upper sides of the frames by pairs of bolts 84 at each end. Bolts 86 are secured at their lower ends to each of the diagonal plates 80. The upper ends of these bolts are loosely supported by a plate 62 corresponding to that shown in FIG. 16, by means of which the clamps are moved perpendicular to and from the lower clamping element, and springs 85 are mounted on the bolts between the plate 80 and the plate 62 so that after the upper clamping elements are engaged with the lower clamping elements, the sealing means can be forced downwardly into engagement with the material to be sealed.

In order to secure uniformity of contact of the heat-sealing ribbon with the work and to compensate for minor expansion of the ribbon by heating, it is desirable yieldingly to hold the latter at its four corners as diagrammatically shown in FIG. 11a, to maintain the entire ribbon under tension. To this end a bracket 88 is bolted to the plate 62 above each corner of the upper clamping member 12a so as to extend downwardly therefrom approximately on a line making 45° with the angle of the ribbon. Each bracket 88 has at its lower end horizontal grooves 90 at each side for slidably receiving the tines 92 of a bifurcated block 94 from which extends an arm 96. The lower end of the bracket contains a tubular chamber 98 and the block 94 contains a tubular chamber 100 which is in alignment with the chamber 98. A coiled spring 102 (FIG. 14) is disposed with its ends in the respective chambers 98 and 100 and a screw 104 is threaded through the bracket into the chamber 98 and has on it a head 106 by means of which pressure may be applied to the spring 102. By applying compression to the spring 102 the arm 96 may be yieldably forced outwardly along the diagonal bisecting the corner. At the distal end of the arm 96 there is a vertical hole 108 (FIG. 15) within which there is secured a bushing 110. A bolt 112 is mounted in the bushing 110 and secured therein by a shoulder 114 which has contact with the lower end of the bushing and a nut 116 threaded onto the upper end which has contact with the upper end of the bushing. The lower portion of the bolt 112 extends downwardly into the groove of the upper clamping element (FIG. 13). A notch 106 (FIG. 12) is formed in the upper side of the upper clamping element through which the lower end of the bolt 112 passes into the groove and which permits movement of the bolt along the diagonal. The lower end of each bolt contains a slot within which the upper edge of the sealing ribbon 52 is secured. As thus constructed, by applying pressure to the springs 102 at each of the four corners, the arms 96 force the bolts which support the four corners of the ribbon outwardly along the diagonals of the frame, placing the lengths of the ribbons between corners under tension and providing means for automatically taking up any slack which develops by reason of expansion of the ribbon during the heat-sealing operation, and at the same time eliminating any waviness in the ribbon.

The packaged articles, as discharged onto the conveyor, are loosely contained therein any may be used in this form without further processing. Optionally, however, they may be moved by the conveyor into a shrinkage chamber where the envelopes are shrunk so as to conform closely to the exact contour of the articles as shown in FIGS. 9 and 11.

It should be understood that the present disclosure is for the purpose of illustration only and that this invention includes all modifications and equivalents which fall within the scope of the appended claims.

We claim:
1. In a packaging machine for heat-sealing, upper and lower clamping elements for clamping heat-sealable material about an article to be packaged during sealing, said upper clamping element containing a continuous groove of rectangular configuration and means for supporting a heat-sealing ribbon of corresponding shape within said groove, comprising supports at the four corners of the upper clamping elements having ways at two sides, yokes having spaced parallel arms slidably disposed in said ways for movement along lines bisecting the angles at the corners of the upper support, a horizontal arm projecting outwardly from each yoke along said bisecting line, a pin fixed in the distal end of each arm having a lower end extending downwardly from the arm into the groove to which the corner of the ribbon is fixed, said supports and yoke containing aligned openings, springs disposed in said openings and adjustable means on the supports operative to compress the springs.

2. In a heat-sealing machine, means for yieldably supporting a ribbon formed into a rectangle, comprising supporting means at the four corners of the ribbon to which the four corners of the ribbon are attached, each of said means yieldably pushing the corners of the ribbon attached thereto in directions outwardly along lines bisecting the angles.

3. In a packaging machine, means for supporting a heat-sealing ribbon formed into a rectangle for movement into engagement with sheet material to effect sealing thereof about an article, comprising a support adjacent each corner of the ribbon, said supports being movable in unison to effect raising and lowering of the ribbon into and out of operative position, and yieldable means carried by each of the supports to which the corners of the ribbon are attached, said yieldable means urging the corners of the ribbon outwardly along lines bisecting the corners.

4. In a packaging machine, means for supporting a heat-sealing ribbon formed into a rectangle for movement into and out of operative position, comprising supports at the four corners of the ribbon movable in unison toward and from the sheet material, a yoke member mounted on each support for movement in a direction along the bisector of the angle at the corner of the ribbon, each yoke including a horizontal arm, the distal end of which is connected to the corner of the ribbon, and springs operating on the yoke members yieldingly to urge the arms outwardly in directions to place the ribbon in tension throughout its length.

5. In a packaging machine, means for supporting a heat-sealing ribbon formed into a rectangle for movement into and out of operative position, comprising supports at the four corners movable in unison, and spring-loaded means connecting the four corners of the ribbon to the supports, said spring-loaded means distending the ribbon in tension throughout its length.

6. A packaging machine according to claim 4, wherein the spring-loading means comprises a yoke slidably mounted on each support for movement along a line bisecting the angle at the corner of the ribbon, said arm extending outwardly from the yoke toward the corner of the ribbon, a pin fixed in the distal end of the arm with an end projecting vertically downward therefrom to which the corner of the ribbon is fixed, and a compression spring abutting at one end a part of the support and at its other end a part of the yoke, said springs at the four corners urging the yokes and hence the arms outwardly in directions to distend the ribbon in tension.

7. In a packaging machine for heat-sealing, upper and lower clamping elements of rectangular configuration movable relative to each other to clamp the heat-sealable material about the article to be packaged during sealing, said upper clamping element having a cross-section providing a U-shaped channel, a heat-sealing ribbon formed into a rectangle, and means supporting the ribbon in the channel, comprising arms attached to the supports for the clamping elements so as to be movable therewith, means at the distal ends of the arms extending into the channel to which the corners of the ribbon are attached, and means yieldingly urging the arms outwardly along lines bisecting the corners of the clamping elements to place the entire length of the ribbon in tension within the channel.

References Cited
UNITED STATES PATENTS

| | | | |
|---|---|---|---|
| 2,549,122 | 4/1951 | Osterhof | 53—28 |
| 2,695,483 | 11/1954 | Toews | 53—182 XR |
| 2,896,387 | 7/1959 | Brock | 53—182 XR |
| 3,047,991 | 8/1962 | Siegel et al. | 53—182 |
| 3,067,553 | 12/1962 | Rivman et al. | 53—28 |
| 3,135,077 | 6/1964 | Siegel et al. | 53—182 |
| 3,262,833 | 7/1966 | Zelnick | 53—182 XR |

GRANVILLE Y. CUSTER, JR., *Primary Examiner.*